April 18, 1933.    L. H. CHURCH    1,904,409
CABLE CONNECTER
Filed Oct. 19, 1929    3 Sheets-Sheet 1
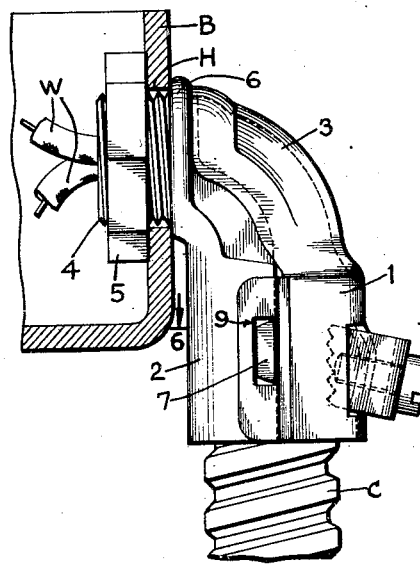
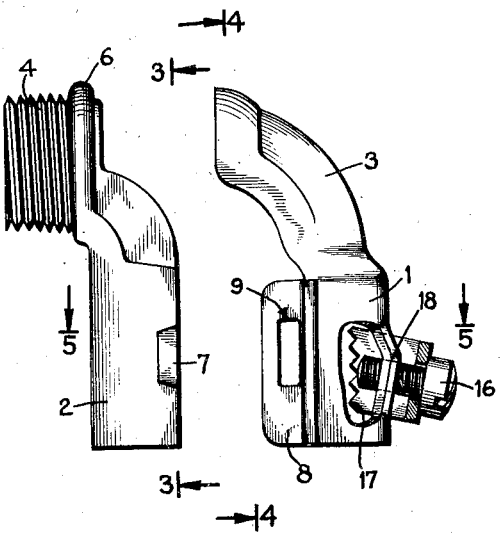
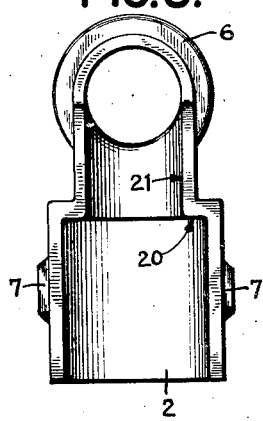
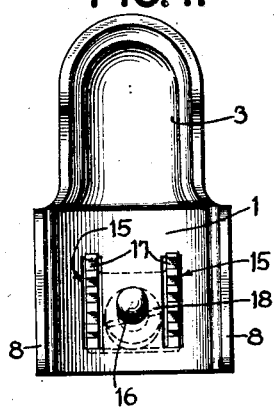
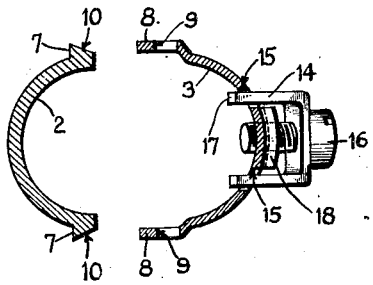
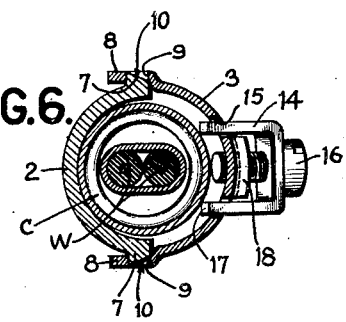
Inventor
LEWIS H. CHURCH
By his Attorneys
Bohleber & Ledbetter April 18, 1933.  L. H. CHURCH  1,904,409
CABLE CONNECTER
Filed Oct. 19, 1929  3 Sheets-Sheet 2
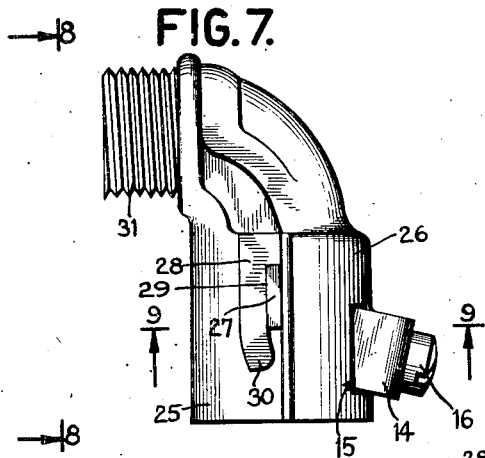
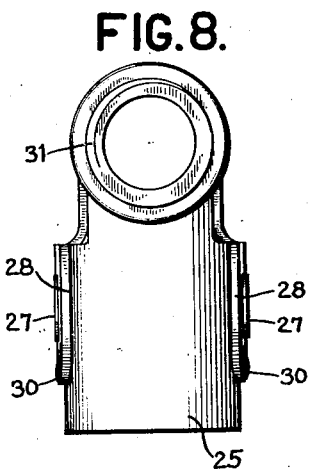
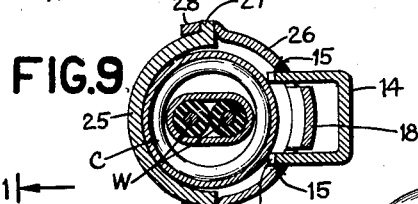
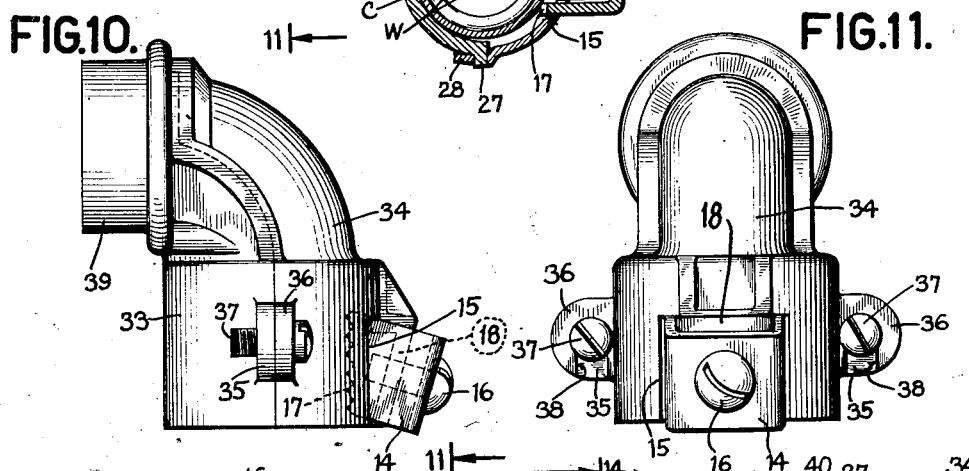
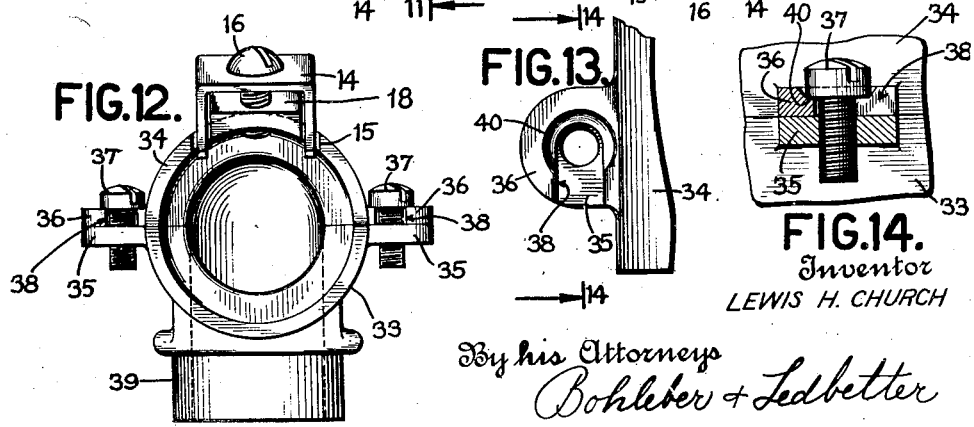
Inventor
LEWIS H. CHURCH
By his Attorneys
Bohleber + Ledbetter April 18, 1933. L. H. CHURCH 1,904,409
CABLE CONNECTER
Filed Oct. 19, 1929 3 Sheets-Sheet 3
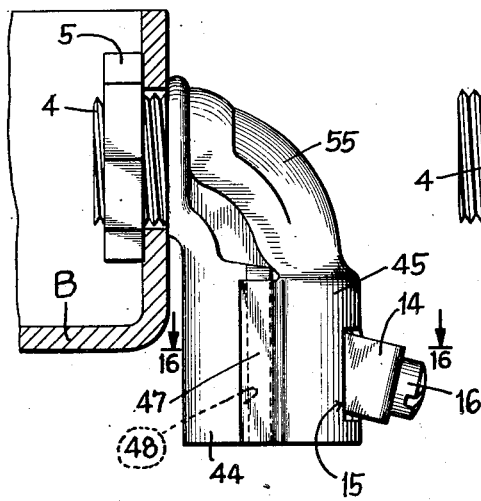
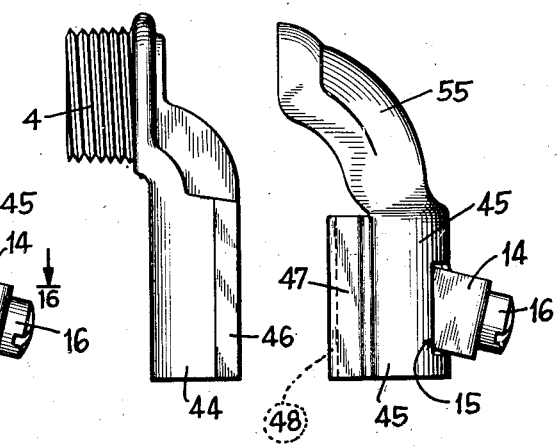
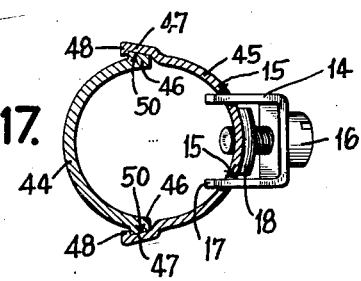
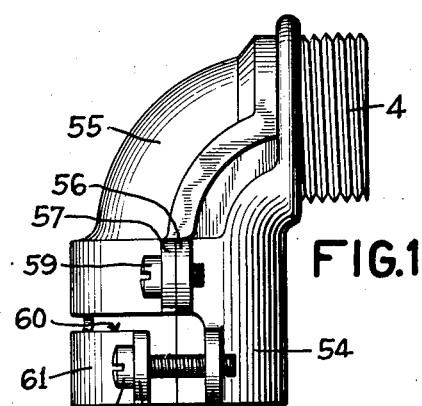
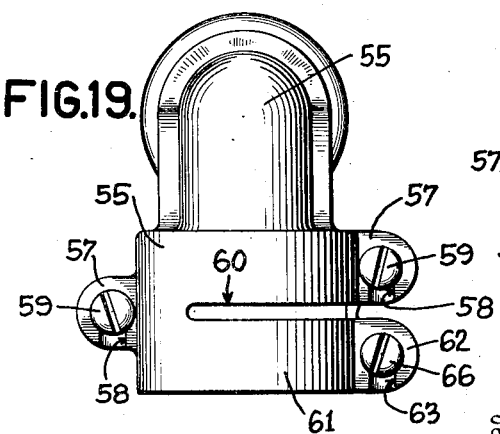
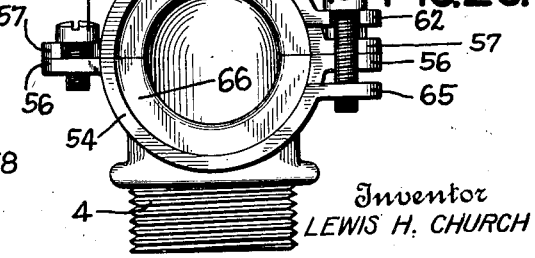
Inventor
LEWIS H. CHURCH
By his Attorneys
Bohleber & Ledbetter Patented Apr. 18, 1933

1,904,409

UNITED STATES PATENT OFFICE

LEWIS H. CHURCH, OF ROSELLE, NEW JERSEY, ASSIGNOR TO THE THOMAS & BETTS CO., OF ELIZABETH, NEW JERSEY, A CORPORATION OF NEW JERSEY

CABLE CONNECTER

Application filed October 19, 1929. Serial No. 400,808.

This invention relates to electrical fittings adapted to be used for electrical wiring and in particular has reference to connecters, more particularly cable connecters, which are attachable to an outlet box opening and carry a wire or cable into the box. The cable connecter is provided with a wire clamping means and an entry into the outlet box for connection with a lighting fixture or other electrical construction.

An object of the invention is to provide a cable connecter constructed in two separable parts or halves so that the wire passage within the fitting may be exposed in order that a wire may be more conveniently passed therethrough into the box and in which a wire or cable clamping means also locks the separable parts of the connecter together upon clamping the wire or cable in the connecter.

Another object of the invention is to construct a connecter consisting of separable parts or halves which are retained together by interengaging means, which means are locked together against separation upon clamping of a cable within the connecter by means of cable clamping means.

Other objects of the invention will be more apparent from the following description taken in connection with the accompanying drawings in which:—

Figure 1 is a view of the connecter secured in position in a box hole with the box in section and showing the interengaging means retaining the separable portions of the connecter together as well as the cable clamping means.

Figure 2 is an exploded view of the two portions of the connecter with the interengaging retaining means and a partial section through one of the portions or members showing the cable clamping means.

Figure 3 is a view looking into the cable passage of one of the portions of the connecter.

Figure 4 is a view looking into the cable passage of the other portion of the connecter and showing the cable anchorage means.

Figure 5 is a section on line 5—5 of Figure 2 of the connecter showing the interlocking means for retaining the two portions together and also showing the cable clamping means.

Figure 6 is also a sectional view of the connecter on line 6—6 of Figure 1 passing through the interengaging means and the cable clamping means, with an armored cable in position therein and clamped by the cable clamping means.

Figures 7 to 9 show a second form of interengaging means.

Figure 7 is a view of another type of interengaging means from that shown in Figures 1 through 6 for securing the two portions of the cable connecter together.

Figure 8 is a side view of the connecter shown in Figure 7 looking towards or into the box hole anchorage end of the connecter.

Figure 9 is a section on line 9—9 of Figure 7 showing a cable clamped in position in the connecter and the interengaging means.

Figures 10 to 12 show a third form of interengaging means.

Figure 10 shows a third form of interlocking means for securing the two portions of the connecter together.

Figure 11 is a side view of the connecter of Figure 10 looking at the cable clamping means.

Figure 12 shows the connector of Figure 10 as viewed from the cable clamping end of the connecter.

Figure 13 is a view showing an improvement in the interengaging means shown in Figure 10 in which the two portions of the connecter are positively locked together against separation.

Figure 14 is a section on the line 14—14 of Figure 13 showing a construction by which positive locking of the interengaged locking means of the connecter in Figure 10 may be accomplished.

Figures 15-17 show a connecter which may be assembled by snapping the parts together or may be assembled by longitudinally sliding the parts together.

Figure 15 is an assembled view of another type of interengaging means for the connecter with the connecter anchored within a box hole which box is shown in section.

Figure 16 is an exploded view of the connecter of Figure 15 showing the separate parts of the connecter.

Figure 17 is a section of the connecter taken on line 16—16 of Figure 15 and showing the interengaging construction.

Figures 18-20 show a separable connecter utilizing a squeeze type of cable clamp.

Figure 18 is a view of a connecter having interengaging means similar to that shown in Figures 10-12 with a squeeze type of cable clamp.

Figure 19 is another view of the interengaging means and the cable clamping means of Figure 18.

Figure 20 is an end view looking into the cable clamping end of the connecter showing the action of the squeeze type of cable clamp.

The connecter of this invention is constructed of two portions which are adapted to fit together to form a completed connecter. The two portions form approximately one-half respectively of the completed connecter and are essentially split along a diametrical plane of the connecter. One portion of the connecter carries the means whereby the connecter may be secured in any known manner in a box hole, such as an outlet or fixture support box. The connecter is made in two portions so that a workman in making a wiring installation may anchor one half or portion of a connecter in the box hole and easily and readily place the cable which is preferably an armored cable, within this half of the connecter and project the wires into the box.

In accomplishing this result means are provided for interlocking the two portions together which are tightened or locked against separation of the two portions upon tightening of the cable anchoring means to clamp a cable within the connecter. Various modifications or forms of interlocking means are shown but in the broad view of the invention the connecter consists of interlocking means which positively interlock the two portions together against separation upon operating the clamping means to clamp a cable within the connecter.

A box B shown in Figure 1 has a box hole opening H in which is secured the connecter 1. This connecter consists of two portions 2 and 3 which fit together to form the complete connecter 1. Each portion or part 2 and 3 forms approximately half of the circumference of the connecter, one of the portions or halves of the connecter namely portion 2 is provided with a threaded neck 4 upon which a lock nut 5 is adapted to be threaded. A shoulder 6 at the end of the threaded neck 4 cooperates with the lock nut 5 to clamp the box wall therebetween, the threaded neck 4, the lock nut 5, and the shoulder 6 together forming the box hole anchorage means. Any other form of construction for anchoring the connecter within the box hole is contemplated in this invention and the form shown is illustrative only.

At the other end of the connecter which forms the cable clamping end, the cable C is adapted to be clamped so that the wires W carried by the cable may be projected into the box B. This end is provided with interlocking means for retaining and securing the two portions of the connecter together. In the form shown in Figures 1 through 6 this interlocking means consists of a shoulder or projection 7 on each side of the member 2 and an ear 8 upon each side of the member 3 having an opening 9 therein. The ears 8 are resilient and may be flexed apart for insertion over the projection 7 which projections snap into the openings 9 to lock the two members together. The faces 10 of the projections 7 are inclined which incline assists in flexing the ears 8 apart upon forcing the ears transversely upon the projections 7. It is obvious that the projections 7 and the ears 8 may be reversed so that the ears are provided upon the member 2 and the projections upon the member 3 if desired.

The two portions 2 and 3 forming the completed connecter may be positively locked together by exerting a transverse force outwardly to separate the two portions. This outward force causes the opening 9 to pull against the projection 7 and thereby positively lock the two portions together against separation. The means utilized to obtain this transverse force is the cable clamping means which may take any form so long as it is provided upon one of the portions of the two part connecter and exerts a force against a cable inserted in the cable clamping end of the connecter which force is transmitted through the cable to the other portion or part of the connecter and tends to separate the two parts. The interlocking means however retains them in interlocking relation against separation yet the pressure of the cable clamping means is resisted by the interlocking means which locks them together against separation. The cable clamping means is shown upon the portion 3 of the connecter although it may be provided as well upon the portion 2.

The cable clamping means in its preferred form consists of a U-shaped member 14 which projects through slots 15 in the wall of the portion 3. A screw 16 passes freely through the U-shaped member and is threaded in the wall of the portion 3. The edges of the U-shaped member contacting with the cable to clamp the cable within the connecter may be provided with serrations 17 to more firmly grip the metallic surface of the armor surrounding the cable. For soft cable another type of clamp may be advisable. Operation of the screw forces the clamp into contact with the cable to clamp it in the connecter. It is obvious that this clamp is also suitable for clamping any protective covering for cable and the term clamping means contemplates the clamping of any form of covering such as conduit or armor.

The operating screw 16 may furthermore extend at an angle to the axis of the connecter in which case the wall of the portion 3 may be projected outwardly forming an angular wall 18 into which the screw 16 is threaded. The angular position of the screw with respect to the cable more firmly clamps the cable within the connecter and thereby more certainly prevents an inadvertent pulling of the cable out of the connecter. The manner in which the cable clamping means engages the cable to clamp the cable within the connecter and the manner in which the cable clamping means exerts a transverse force tending to separate the two portions of the connecter against the resistance of the interengaging means which positively locks the portions of the connecter together is an important feature of this invention.

In order to take the connecter apart, the cable is unclamped from the connecter by unscrewing the screw 16 and the ears 8 may be sprung apart by means of a screw driver so that the projections 7 are released from within the openings 9. A shoulder 20 may be provided in one or both of the connecter portions against which the end of the armor of the cable C abuts and the wires pass through the cable passage 21 into the box B.

There are other ways in which the two portions of the connecter may be locked together and one such other way is shown in Figures 7 through 9. In this construction the connecter consists of the two portions 25 and 26 as heretofore described and a projection 27 is provided upon one of the portions such as on portion 25. The other portion namely portion 26 has on either side thereof an ear 28. A slot 29 extends into the ear axially with respect to the axis of the portion 26 and the end 30 of the ear 28 is bent upwardly which narrows the slot 29 at this end or forms a shoulder at the opening of the slot. A cable clamping means such as the U-shaped member 14 and the operating screw 16 of Figure 1 is provided, the legs of the U-shaped clamp passing through the slots 15 in the wall of the portion 26. This cable clamping means is constructed and functions in exactly the same manner as the cable clamping means of Figure 1. A box anchorage mechanism is provided on the threaded neck 31 for anchoring the connecter in a box hole opening.

In assembling the two portions of the connecter with this type of interlocking means, portion 26 is projected axially of the connecter so that the projections 27 of the portion 25 slips into the slot 29 formed by the ear 28. The ear 28 may be flexible so that the narrow portion of the slot 29 caused by the upbending of the end 30 of the ear 28 flexes upon pushing the projection 27 therebetween and springs back after the projection 27 has passed by this narrow end and is completely inserted in the slot 29 to form a flexibly releasable retaining means. The projections 27 and the ears 28 form interengaging means which retains the two portions against separation. The upbent end 30 also provides a shoulder which positively locks the two portions of the connecter together upon a cable being inserted and clamped within the connecter by the cable clamping means. This is accomplished by the clamping of the cable within the connecter which tends to forcibly separate the portions 25 and 26 so that the projection 27 forcibly engages the ear 28 and the shoulders formed by the upbending of the end 30 forms a stop which positively prevents the portion 26 from sliding longitudinally to separate the two portions of the connecter.

Still another form of interengaging means is shown in Figures 10 through 14. In this type of interengaging means the portions 33 and 34 of the connecter, which form respectively half of the connecter, an ear 35 projects on either side of the portion 33 and a corresponding ear 36, projects from either side of the other portion 34 of the connecter. The ear 35 is threaded for the reception of a screw 37, and the ear 36 carries a slot 38 so that the portion 34 may be slid longitudinally in position with the screws 37 threaded in the ears 35 by slipping the screw through the slot 38 and under the screw head. The two portions of the connecter may now be interlocked together by tightening the screws 37. The two portions 33 and 34 may also be interlocked together by clamping the cable within the connecter in which the same type of cable clamping means may be utilized. This consists of the U-shaped member 14 projecting through the slots 15 of the portion 34, the U-shaped member being forcibly projected against the cable by means of the operating screw 16. This cable clamping means also tends to cause forcible separation of the members 33 and 34 so that the ear 36 is pressed forcibly against the head of the screw 37 thereby locking the two portions 33 and 34 together without the need of tightening the screws 37. Tightening of the screws 37 is an additional assurance against separation of the two portions. The portion 33 carries a means 39 whereby the connecter may be anchored within a box hole opening in any known manner.

Figures 13 and 14 show an improvement on the construction of the interengaging means of Figures 10 through 12 in that the ear 36 carries a recess 40 to receive the head of the screw 37. This recess positively interlocks the two members together against separation since the head of the screw 37 may be screwed into the recess after the ear 36 has been inserted or slid underneath the head of the screw 37. Another way in which this recess 40 may function is that upon tightening of the screw 16 to clamp a cable within the connecter with the cable clamping means the portions 33 and 34 of the connecter are forcibly separated until the ear 36 contacts with the head of the screw 37. This separation of the two portions projects the head of the screw 37 into the recess 40 to positively lock the two portions together against separation.

It is to be noted that the interengaging means of Figures 10 through 13 is essentially similar to the interengaging means of Figures 7 through 9. In both constructions of the interengaging means a slot is provided upon one of the separable portions which slot is engaged by a projection upon the other separable portion. The slot 38 of Figures 10 through 12 corresponds with the slots 29 of Figures 7 through 9 and the headed screw 37 of Figures 10 through 12 corresponds in function and effect with the projections 27 in Figures 7 through 9. The recess 40 of Figures 13 through 14 provides the shoulder whose function and effect is identical to the function and effect of the shoulder formed by the upbending of the end 30 of the ear 28 of Figures 7 through 9.

Referring to Figures 15 through 17 which show a cable connector consisting of separable portions having interengaging means which may be assembled by longitudinally sliding the two parts together and may also be assembled by snapping the two parts transversely together. In this construction the connecter consists of the two separable portions 44 and 45 as described in the other forms. One of these portions is provided with a projection 46 on opposite sides thereof extending substantially the full length of the straight portion of the connecter and the other separable member 45 is provided with a pair of elongated ears 47 which are bent inwardly to form the shoulders 48.

The bent in shoulders 48 extend the entire length of the ear and are without obstructions so that projections 46 of the separable portion 44 may be slid longitudinally into the recess formed by the shoulders 48 of the ears 47. The shoulders 48 engage in back of the shoulders on the projection 46 and prevent transverse separation of these separable portions. The ears 46 are also provided with an angular face 50 which serves as a wedging face to spread the ears 47 apart so that the shoulders 48 may be snapped transversely over the projection 46 and assembled in this transverse direction as well as assembled by relative longitudinal movement between the two separable portions.

The clamping means consists of a U-shaped clamping member 14 and is utilized as in the other forms to obtain clamping of a cable within the connecter which clamping also exerts a force tending to cause transverse separation of the two separable parts 44 and 45. This transverse force locks the interengaging means together and consequently locks the separable portions against either transverse or longitudinal separation. The clamping means is of the same constructions as shown in the forms of connecters previously described and consists of a U-shaped member 14 extending through slots 15 in the wall of one of the separable portions which, in this instance, is the portion 45 although the clamping means may with equal effectiveness be provided upon the other separable portion. The clamping screw 16 passes through the clamping member 14 and is threaded into the wall of the separable portion which wall may be angularly protruding in order to provide an angular force to the cable clamp 14 and in that way more effectively clamp a cable within the connecter.

Another type of connecter having separable portions similar to those heretofore described are assembled by longitudinally sliding these portions together. Interengaging means are provided to secure the separable portions together against separation in assembled relation. These interengaging means are essentially identical to the interengaging means of Figures 10 through 12 but the cable clamping means utilized is of the so called squeeze type. The principal feature of this type of cable clamp to be noted is that the cable clamping means is not upon one of the separable portions, but has some portion of the cable clamp upon both of the separable portions. In other words the cable clamp may have parts located and dependent upon both of the separable portions to obtain its clamping function.

This connecter also consists of two separable parts 54 and 55 having box hole anchorage means 4 as previously described. The interengaging means retaining the separable portions together consist of a pair of ears 56 projecting from opposite sides of the separable portion 54 and a pair of similar ears 57 projecting from opposite sides of the other separable portion 55 and adapted to correspond in position with the ears 56 when the separable portions are in assembled relation. The projecting ears 57 are provided with a slot 58. A screw 59 is threaded into the ears 56 and these screws are adapted to receive or interengage with the slot 58 in the ears 57 and hold the separable parts against separation. The heads of the screws 59 prevent separation of the separable portions.

The separable portion 55 carries a circumferential slot 60 thereby forming a flexible strap 61 for engaging and clamping a cable within the connecter. The strap 61 terminates in an ear 62 having a slot 63. The separable portion 54 carries a second ear 65 having a screw 66 threaded therein. This screw 66 is adapted to be received in the slot 63 of the ear 62 on the strap 61 so that in assembling the two portions together the interengaging means are in assembled position to hold the separable portions together against transverse and longitudinal separation and at the same time the cable clamp is in assembled relation to clamp a cable within the connecter. Upon tightening of the screw 66 the strap 61 is contracted to clamp a cable within the connecter, and also locks the interengaging means against separation. A shoulder 66 may also be provided if desired to serve as an abutment for the end of armored cable or for other insulating or armored coverings if the connecter should be used with these types of cable.

Although a particular form of cable clamping means has been shown and described herein it is to be understood that any form of cable clamping means is contemplated by this invention which clamping means engages the cable and tends to forcibly separate the two portions of the connecter. It is this partial or slight separation of the two members which positively anchor them together by the separation of the interlocking means. Similarly three forms of interlocking means has been shown but it is obvious that other forms of construction are suitable for the purpose so long as they are adapted to be interengaged to interlock the two portions against separation upon clamping of the cable into the connecter by operation of the clamping means. Various other modifications are apparent to those skilled in the art and this invention is not intended to be limited by the preferred construction shown and described herein excepting as limited by the accompanying claims.

What is claimed is:—

1. An elbow connecter comprising two separable portions forming a complete connecter with the interior of each portion exposed when separated, a box hole anchorage means upon one of said portions extending at an angle to the axis of the connecter, the portions being separable around the bend of the elbow to form a straight passage through the box hole anchorage means which is unobstructed by the portion carrying the same, interengaging means upon said portions engageable and completely disengageable upon relative axial movement therebetween for retaining the portions together and permitting complete separation thereof, and clamping means upon at least one of said portions for clamping a cable within the connecter and for locking said interengaging means against separation of the portions.

2. An elbow connecter comprising two separable portions each forming substantially half of the circumference of the connecter, a box hole anchorage means upon one of said separable portions extending at an angle to the axis of the connecter, the portions being separable around the bend of the elbow to form a straight passage through the box hole anchorage means which is unobstructed by the portion carrying the same, interengaging means upon each side of said separable portions; each interengaging means including a recess upon one portion, and means upon the other portion engaging within and disengageable from the recess upon relative axial movement therebetween and between the portions to retain the portions together and to permit complete separation of the portions from each other; and cable clamping means upon at least one of said separable portions for clamping a cable within the connecter and for exerting a pressure between the edge of the recesses and the recess engaging means to lock the separable portions together.

3. A connecter comprising two separable portions forming a complete connecter, box hole anchorage means upon one of said portions, interengaging means consisting of projections upon each side of one of said separable portions, and ears upon each side of the other separable portion engaging with and disengaging from the projections of the first separable portion upon relative axial movement therebetween to retain the portions together, and clamping means upon one of said portions and movable radially thereupon into the connecter for clamping a cable within the connecter and for forcing the portions radially outward thereby exerting a pressure between the projections and ears of the interengaging means to lock them together.

4. A connecter comprising two separable portions each forming substantially half of the circumference of the connecter, box hole anchorage means upon one of said separable portions, interengaging means upon each side of said separable portions; each interengaging means including a projection upon one of said separable portions, an ear upon the other separable portion, a recess in each ear receiving and separable from a projection upon relative axial movement therebetween to retain the separable portions together; and clamping means upon one of said separable portions and movable radially thereupon to force the clamping means radially into the connecter to clamp a cable therein and to force the portions radially outward to exert a pressure between the projections and the edge of the recesses to lock the separable portions together.

5. A connecter comprising two separable portions forming a complete connecter, box hole anchorage means upon one of said portions, snap interengaging means upon said portions for retaining the portions together, and clamping means upon one of said portions for clamping a cable within the connecter and for locking said interengaging means against separation of the portions.

6. A connecter comprising two separable portions each forming substantially half of the circumference of the connecter, box hole anchorage means upon one of said separable portions, interengaging means upon each side of said separable portions; each interengaging means including a flexible ear upon one of said separable portions, a recess in each ear, and a projection upon the other separable portion to engage within the recess and being insertable upon flexing of the ears; and cable clamping means upon one of said separable portions for clamping a cable within the connecter and for exerting a pressure between the edges of the recess and the projections to lock the separable portions against separation.

7. A connecter comprising two separable portions each forming substantially half of the circumference of the connecter, box hole anchorage means upon one of said separable portions, a flexible ear upon either side of one of said separable portions, a recess in each ear, projections upon either side of the other separable portion to engage within the recess and being insertable upon flexing of the ears, and cable clamping means upon the separable portion having the flexible ears to clamp a cable within the connecter against the other separable portion thereby exerting a pressure between the edges of the recess and the projections to lock the separable portions against separation.

8. A connecter comprising two separable portions each forming substantially half of the circumference of the connecter, box hole anchorage means upon one of said separable portions, a flexible ear upon either side of one of said separable portions, a recess in each ear, projections upon either side of the other separable portion to engage within the recess and being insertable upon flexing of the ears, an angular face upon said projections to cause flexing of the ears upon transverse pressure being applied to the separable portions and cable clamping means upon one of said separable portions for clamping a cable within the connecter and for exerting a pressure between the edges of the recess and the projections to lock the separable portions against separation.

9. A connecter comprising two separable portions each forming substantially half of the circumference of the connecter, box hole anchorage means upon one of said separable portions, interengaging means upon each side of said separable portions; each interengaging means including a longitudinal slot open at one end thereof upon one of said separable portions, and a projection upon the other separable portion engageable in and disengageable from said slot upon relative movement therebetween; and cable clamping means upon one of said separable portions for clamping a cable within the connecter and for exerting a pressure between the projections and the edges of the slots to lock the separable portions together.

10. A connecter comprising two separable portions each forming substantially half of the circumference of the connecter, box hole anchorage means upon one of said separable portions, interengaging means upon each side of said separable portions; each interengaging means including an ear upon one of said separable portions, a longitudinal slot in each ear and open at one end thereof, and a projection upon the other separable portion engageable in and disengageable from said slot upon relative movement therebetween; and cable clamping means upon one of said separable portions for clamping a cable within the connecter and for exerting a pressure between the projections and the edges of the slots to lock the separable portions together.

11. A connecter comprising two separable portions each forming substantially half of the circumference of the connecter, box hole anchorage means upon one of said separable portions, interengaging means upon each side of said separable portions; each interengaging means including a longitudinal slot upon one of said separable portions, said slot having a narrow opening thereinto at one end, and a projection upon the other separable portion engageable in and disengageable from said slot upon relative movement therebetween; and cable clamping means upon one of said separable portions for clamping a cable within the connecter and for exerting a pressure between the projections and the edges of the slots to lock the separable portions together.

12. A connecter comprising two separable portions each forming substantially half of the circumference of the connecter, box hole anchorage means upon one of said separable portions, interengaging means upon each side of said separable portions; each interengaging means including a longitudinal slot upon one of said separable portions and having an opening thereinto at one end, a projection at the slot opening narrowing the opening into the slot, and a projection upon the other separable portion engageable in and disengageable from said slot upon relative movement therebetween; and cable clamping means upon one of said separable portions for clamping a cable within the connecter and for exerting pressure between the projections and the edges of the slots to lock the separable portions together.

13. A connecter comprising two separable portions each forming substantially half of the circumference of the connecter, box hole anchorage means upon one of said separable portions, flexible ears upon either side of one of said separable portions, a longitudinal slot in each ear, a projection upon either side of the other separable portion engageable in and disengageable from said slot upon relative movement therebetween, the opening in said slots being slightly narrower than the projection to retain the projection within the slot, and cable clamping means upon one of said separable portions for clamping a cable within the connecter and for exerting a pressure between the projections and the edges of the slots to lock the separable portions together.

14. A connecter comprising two separable portions each forming substantially half of the circumference of the connecter, box hole anchorage means upon one of said separable portions, an ear projecting outwardly from either side of one of said separable portions, a headed screw threaded into each ear, an ear projecting outwardly from either side of the other separable member, longitudinal slots in said latter ears to receive the screws, and cable clamping means upon one of said separable portions for clamping a cable within the connecter and for exerting a pressure between the slotted ear and the screw head to lock the separable members together.

15. A connecter comprising two separable portions each forming substantially half of the circumference of the connecter, box hole anchorage means upon one of said separable portions, an ear projecting outwardly from either side of one of said separable portions, a headed screw threaded into each ear, an ear projecting outwardly from either side of the other separable member, longitudinal slots in said latter ears to receive the screws, a recess in said slotted ears to receive the head of the screw, and cable clamping means upon one of said separable portions for clamping a cable within the connecter and for projecting the screw head into the recess in the slotted ear to lock the separable members together.

16. A connecter comprising two separable portions each forming substantially half of the circumference of the connecter, box hole anchorage means upon one of said separable portions, a projection having a shoulder upon each side of one of said separable portions, ears upon each side of the other separable portion, said ears having an inwardly extending shoulder to engage the shoulder upon the projection, and cable clamping means upon one of said separable portions for clamping a cable within the connecter and for exerting a pressure between the projections and the inwardly projecting shoulder upon the ears to lock the separable portions against separation.

17. A tubular elbow shaped at one end to be screwed into a wall or other element, said elbow being divided into two members from the opposite end past the bend so as to separate the convex half of the bend in the elbow and the corresponding side of the elbow to the latter end from each other, one of said members having thereon hooks facing lengthwise of the elbow and projecting laterally, and the other member having thereon headed screws adapted to be engaged with said hooks through a lengthwise relative sliding movement of said members.

18. A connecter comprising two separable portions forming a complete connecter, box hole anchorage means upon one of said portions, interengaging means upon said portions engageable and completely disengageable upon axial movement of one portion relatively to the other, and clamping means upon one of said portions and movable radially thereupon to force the clamping means radially into the connecter to clamp a cable therein and to force the portions radially outward to lock the interengaging means and portions against separation.

19. An elbow connecter comprising two separable portions forming a complete connecter with the interior of each portion exposed when separated, a box hole anchorage means upon one of said portions extending at an angle to the axis of the connecter, the portions being separable around the bend of the elbow to form a straight passage through the box hole anchorage means which is unobstructed by the portion carrying the same, interengaging means upon said portions engageable and completely disengageable upon relative movement therebetween for retaining the portions together and permitting complete separation thereof, shoulders upon the interengaging means retaining the portions against separation, and clamping means upon at least one of said portions for clamping a cable within the connecter.

In testimony whereof I affix my signature.

LEWIS H. CHURCH.